United States Patent [19]

Dines et al.

[11] Patent Number: 4,512,707

[45] Date of Patent: Apr. 23, 1985

[54] SYSTEM FOR LOADING AND DISPENSING ARTICLES FROM A MAGAZINE

[75] Inventors: David R. Dines, Oklahoma City; Vertis C. Webb, Shawnee, both of Okla.

[73] Assignee: AT&T Technologies, Inc., New York, N.Y.

[21] Appl. No.: 495,561

[22] Filed: May 18, 1983

[51] Int. Cl.³ .............................................. B65G 1/18
[52] U.S. Cl. ...................................... 414/404; 312/42
[58] Field of Search ................ 414/97, 403, 404, 405; 211/49 D, 51.1; 312/35, 42; 53/148, 169, 540

[56] References Cited

U.S. PATENT DOCUMENTS 1,727,979  9/1929  Hunt .
3,438,515  4/1969  Nowicki .
4,170,325  10/1979  Pawlowski .

*Primary Examiner*—Robert G. Sheridan
*Attorney, Agent, or Firm*—R. P. Miller; M. de Picciotto

[57] ABSTRACT

A non-jamming magazine 51 supports bar-like articles 10 in inclined positions so that the lowermost articles may be successively withdrawn and the remainder of the stack will drop without cocking an article between side rails 22 and 23 to jam and preclude further withdrawal of the articles. A parallelogram fixture 50 is used to receive a supply of articles 10 and upon flexing of the fixture, the articles are placed in inclined positions for loading into the magazine.

8 Claims, 11 Drawing Figures

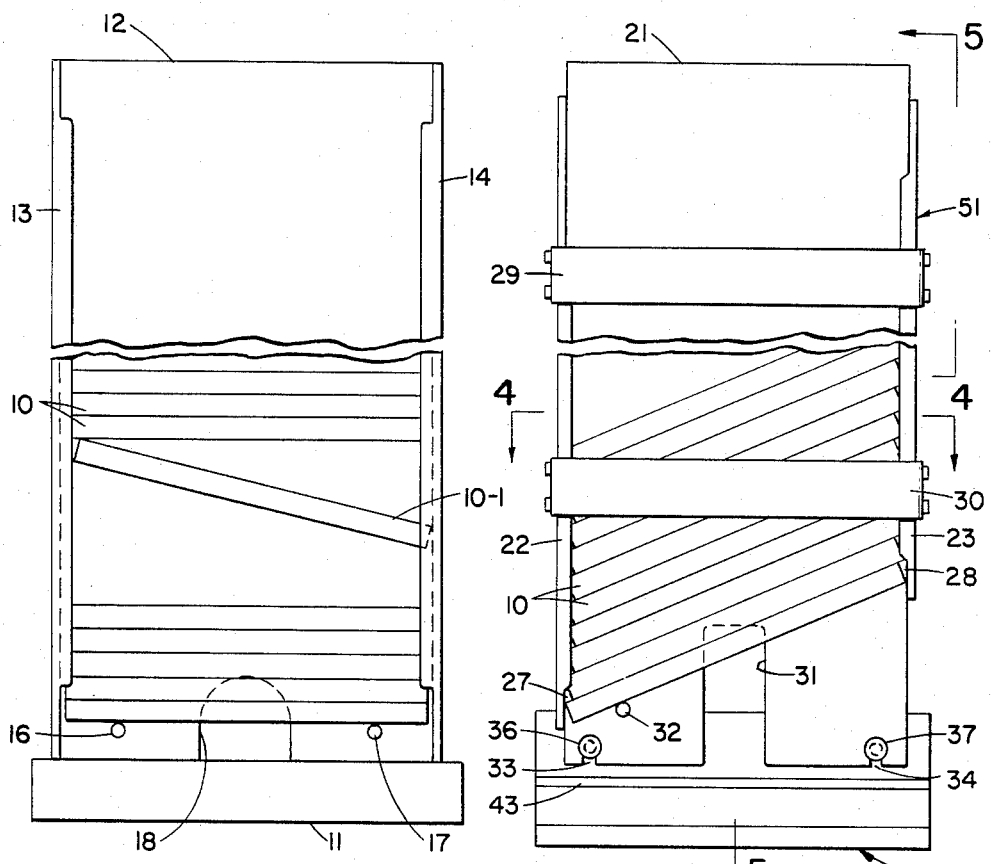
FIG. 1 PRIOR ART
FIG. 2
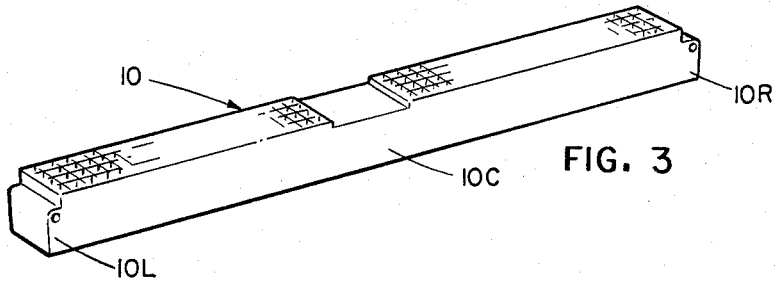
FIG. 3
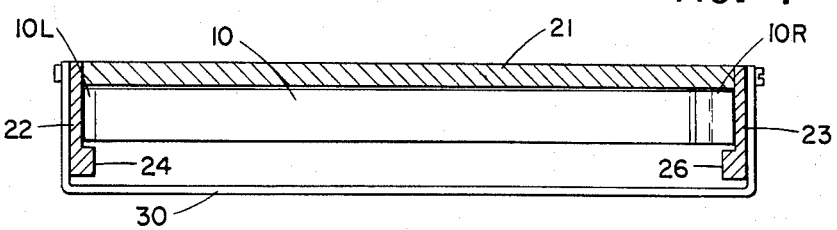
FIG. 4

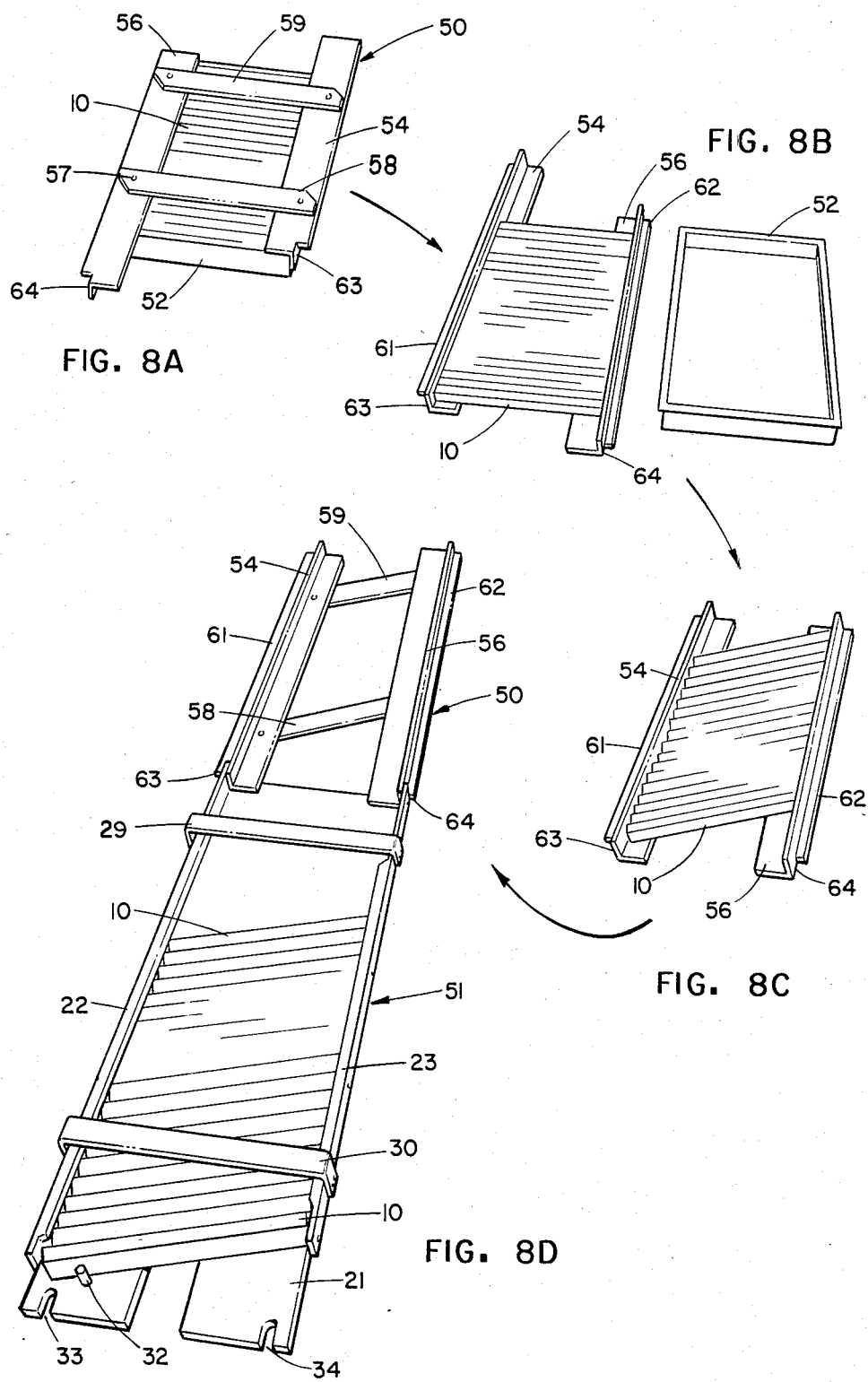

SYSTEM FOR LOADING AND DISPENSING ARTICLES FROM A MAGAZINE

This invention relates to a system for loading and dispensing articles from a magazine, and more particularly, to a system for loading a stack of bar-like articles into a magazine and for dispensing the articles without jamming the articles in the remaining stack.

BACKGROUND OF THE INVENTION

In the assembly of many diverse products, a supply of components are stacked in a magazine from which the components are withdrawn individually for use by an assembly worker. The components often times are in the form of bars, such as telephone equipment connector housings, and in such cases are stacked in the magazine for subsequent withdrawal by successive removal of the lowermost bar from the stack. If the bars are loaded and stacked horizontally, the removal of the lowermost bar results in the dropping of the remaining bars in the magazine. Often this dropping of the stack results in a tilting of one or more of the bars that lock in askew positions to cause a jam, thus precluding the dispensing of further bars from the magazine.

In U.S. Pat. No. 4,170,325, issued Oct. 1979, to T. W. Pawlowski, there is shown a tea bag dispenser wherein a supply of flat rectangular tea bags as loaded in a dispensing carton that is dimensioned to hold the tea bags in angular dispositions. A slot is formed in a lower portion of the carton to allow the lowermost tea bag to drop into and project from the slot to enable a user to easily withdraw the lowermost tea bag from the carton.

SUMMARY OF THE INVENTION

The invention contemplates among other things, an article dispensing system that includes facilities for loading a stack of inclined articles into a magazine where the articles may be successively dispensed from the bottom of the stack without coincident jamming of the remaining articles in the stack.

More particularly, elongated bar-like articles are first loaded into a parallelogram rack which is articulated to place the articles in parallel inclined positions relative to a pair of parallel opposed rack members. The parallel rack members are abutted against a pair of side rails of a magazine. These side rails project from a back plate onto which the stack of articles are transferred so that the inclined stack of articles is positioned between the side rails. The loaded magazine is moved onto an angular support so that the stack of articles drop onto a pin projecting from a lower section of the back plate, whereafter the articles are held in the inclined position resting against the opposed magazine side rails.

An assembly worker or robot may successively pick the lowermost articles from the stack for use in the assembly of a product. After each withdrawal of a lowermost article, the remainder of the stack drops angularly so that the lower edges ride along one of the side rails. In so dropping, the articles do not assume askew positions so as to jam the stack.

BRIEF DESCRIPTION OF THE DRAWINGS

FIG. 1 is a front elevational view showing a prior art magazine for dispensing bars with one of the bars cocked to interfere with the subsequent dispensing of the bars from the magazine;

FIG. 2 is a front elevation view of a bar dispensing magazine embodying certain principles of the present invention;

FIG. 3 is a perspective view of a bar-like connector housing that may be stacked in and dispensed from the magazine shown in FIG. 2;

FIG. 4 is a sectional view taken along line 4—4 of FIG. 2 showing the construction of side rails forming part of the magazine;

FIGS. 8A, 8B, 8C and 8D, a series of perspective views, illustrate the utilization of the loading fixture in loading an inclined stack of articles into the magazine.

DETAILED DESCRIPTION

Figure 6:
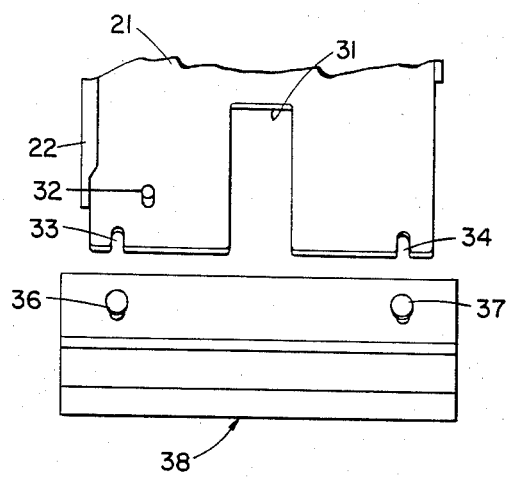
FIG. 6 is a fragmentory front view of the magazine holder and a magazine about to be mounted on the holder.

Referring to FIG. 3, there is shown a typical bar-like article 10 that may be loaded into and dispensed from a magazine of the type forming the subject matter of the present invention. In this instance, the article is a connector housing, a stack of which is loaded in the magazine and individually withdrawn by an assembly worker for use in the assembly of a connector.

One magazine apparatus heretofore used is shown in FIG. 1 and is discussed for the purpose of illustrating a dispensing problem encountered in the use of such a magazine. This magazine apparatus includes a base 11 on which is mounted a vertical plate 12. A pair of side rails 13 and 14 are secured to opposite edges of the plate and serve to guide a stack of articles 10 which are supported on a pair of pins 16 and 17 projecting from the plate 12. An opening 18 is provided in the lower portion of the plate to enable a worker to reach in and pull the lowermost article 10 from the stack. As each article is pulled from the stack the remaining articles drop, and often one or more of the articles tilt, such as article 10-1, so as to cock and be retained between the opposed side rails 13 and 14. The cocked and jammed article 10-1 serves to preclude the further dropping of the stack and the subsequent dispensing of the articles.

Referring now to FIGS. 2, 4, 5 and 6 for consideration of applicant's improved magazining apparatus, there is illustrated a flat plate 21 having a pair of side rails 22 and 23 secured thereto. As best illustrated in FIG. 4, the rails 22 and 23 are formed with inwardly extending flanges 24 and 26 to provide opposed channels to captivate end sections 10-L and 10-R of a stack of articles. The width of the plate 21 and the spacing of the rails 22 and 23 are selected so that the distance between the inner walls of the rails is less than the length of the articles 10, thus requiring that the stack of articles be placed in an inclined relation within the magazine. The lower ends of the flanges 24 and 26 are cut away at 27 and 28 (FIG. 2) to expose the opposite ends 10-L and 10-R of the lowermost article 10. A pair of U-shaped cross braces 29 and 30 are secured to the rails to provide added stability to the magazine. The plate 21 is also provided with an opening 31 through which an attending worker may place fingers to grasp and withdraw the lowermost article. Supporting the stack of articles is a pin 32 projecting from the plate 21 which is spaced from the vertically extending center line of the plate so as to engage the lowermost article at a point which is spaced fromm the longitudinal center 10-C of the articles.

Figure 5:
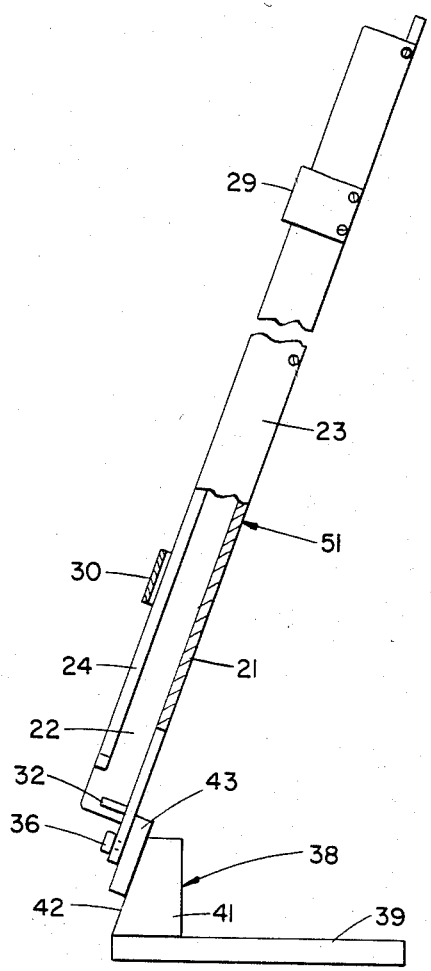
FIG. 5 shows a sectional view taken along line 5—5 of FIG. 2 particularly showing a structure for supporting the magazine at an acute angle.

The lower edge of the plate 21 is formed with a pair of mounting slots 33 and 34 for receiving a pair of headed bolts 36 and 37 extending from a base 38. The base as shown in FIG. 5 includes a base plate 39 on which is mounted a bolster block 41 having a forward inclined face 42 to which is secured a metal strip 43. The mounting bolts 36 and 37 are seated in the strip 43 so that the bolt heads are spaced from the strip a distance approximating the thickness of the plate 21.

In use of the magazine, a supply of articles 10 are loaded on the plate 21 in inclined positions between the side rails 22 and 23. The article loaded magazine is mounted on the base 38 by sliding the lower back portion of the plate along the strip 43 to seat the headed bolts 36 and 37 within the mounting slots 33 and 34. With the magazine mounted on the base, the lowermost article is engaged by the pin 32 to support the article stack in an inclined position.

The assembly worker passes one or two fingers through the opening 31 and grasps the lowermost article. This article is pulled from the stack whereupon the remainder of the stack drops. It should be noted that when the articles are supported in the inclined positions gravity acts to urge and maintain the lower edges 10-L of each article in engagement with the inner wall of the rail 22. When the lowermost article is removed from within, each of the remaining articles are gravity urged to slide along the inner wall of the left rail, and as a result, the stack is guided by the left hand wall to drop in a uniform manner thereby precluding the cocking of one or more of the articles between the opposed inner side walls of the rails.

Figure 7:
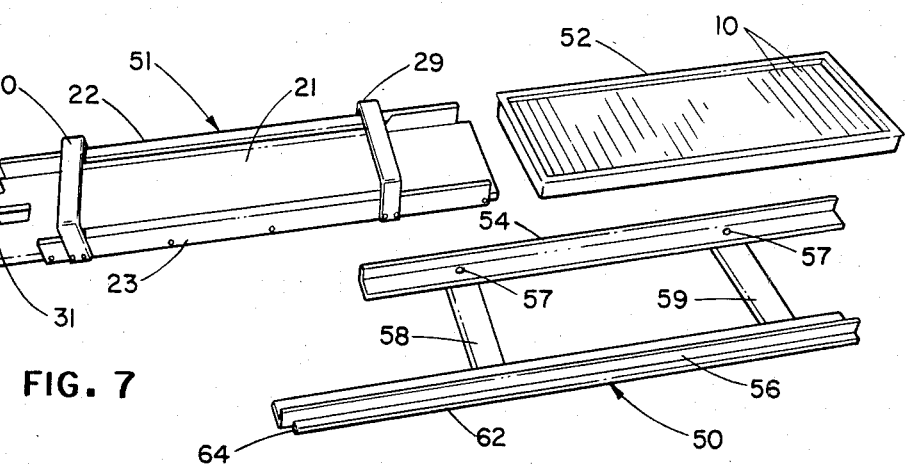
FIG. 7 is a perspective view showing the magazine, a box of articles, e.g., connector housings, and a parallelogram fixture for loading an inclined stack of articles into the magazine.

FIGS. 7 and 8 illustrate the construction of a fixture 50 that may be utilized to load an inclined stack of articles into the magazine. In FIG. 7 there is shown a magazine of the type illustrated in FIGS. 2, 4, 5 and 6 and is generally designated by the reference numeral 51, an open flat box 52 of articles 10 and a parallelogram arrangement of linkages constituting the fixture 50. The parallelogram fixture includes a pair of L-shaped angle irons 54 and 56, actually aluminum extrusions, pivotally connected by pins 57 to a pair of struts 58 and 59. A pair of guide ribs 61 and 62 (FIGS. 7 and 8B) are individually secured to the outer sides of the angle irons. Each rib terminates before the end of the associated angle iron to provide coupling sections 63 and 64 at the ends of the angle irons.

Attention is directed to FIGS. 8A, 8B, 8C and 8D which illustrate the steps to be followed in loading an inclined stack of articles into the magazine. First the parallelogram fixture 50 is flexed into a rectangular first orientation and placed over (FIG. 8A) the box 52 of articles. Next, referring to FIG. 8B, the box 52 and the fixture 50 are turned upside down whereafter the box is removed leaving the stack of articles resting between the angle irons. The articles are arrayed in orthogonal relation with respect to the angle irons. The using worker now grasps the angle irons and flexes the fixture to place the fixture in a rhomboidal second position (FIG. 8C). It will be noted from FIG. 8C that the coupling sections 63 and 64 of the angle irons are now laterally aligned. The fixture is moved to the magazine and the coupling sections 63 and 64 are placed inside of the rails 13 and 14 to couple the fixture to the magazine. The user pushes the inclined stack of articles onto the plate so that the forward article abuts the pin 32. The fixture 50 is removed and the magazine lifted and mounted on the base 38 so that the bolts 36 and 37 are received in the slots 33 and 34. As shown in FIG. 5, the magazine is positioned at a rather steep acute angle so that the articles are gravity urged to abut the article ends 10-L against the inner wall of the left rail 13. The user may now commence withdrawing successive articles, and the stack will successively drop without jamming the articles between the rails.

What is claimed is:

1. A system for dispensing bar-like articles, which comprises:
    a parallelogram arrangement of pivotally connected frame members for initially supporting a supply of bar-like articles orthogonally with respect to a pair of opposed frame members when said frame members are in first positions, and for supporting the supply of bar-like articles at inclines to said opposed frame members when said frame members are pivoted to second positions;
    a magazine having a pair of opposed rails spaced apart a distance equal to the spacing of said opposed frame members when said opposed frame members are in said second positions;
    means for coupling the frame member arrangement in said second position to said opposed rails to enable the transfer of the bar-like articles from said frame member arrangement to said magazine; and
    means secured to saidd magazine for supporting the bar-like articles between said rails in the inclined positions.

2. A system as defined in claim 1 wherein said frame members are rectangularly arranged in said first position and rhomboidally arranged in said second position.

3. A system for loading and dispensing bar-like articles into and from a magazine, which comprises:
    a plate;
    a pair of side rails secured to said plate and spaced apart a distance less than the length of the bar-like articles;
    a parallelogram arrangement of members pivotally connected together, said arrangement including a pair of opposed first side members spaced apart a distance slightly greater than the length of the bar-like articles when said arrangement is flexed to position said first side members orthogonally with respect to the remaining second opposed side members, and for moving said bar-like articles from othogonal positions with respect to said first side members to angular positions with respect to said first side members;
    means for coupling said first side members to said pair of side rails to enable the transfer of a stock of the angularly positioned bar-like articles onto said plate;
    means for mounting said plates at an acute angle to the horizontal to downwardly slide and urge said stack of angularly positioned bar-like articles; and
    means mounted to project from said plate to engage the lowermost bar-like article to support the stack at a distance from the lower edge of said plate.

4. A system as defined in claim 3 wherein said side members are angle irons pivotally connected to a pair of parallel struts, said struts being of such length that the angle irons are positioned a distance less than the lengths of said articles when said parallelogram arrangement is flexed to move the articles into the inclined positions and said angle irons of such length that first ends of the angle irons are moved into lateral alignment.

5. A system as defined in claim 1 wherein said magazine comprises a support plate and a pair of opposed side walls that are spaced apart a distance less than the length of the articles; and wherein said means for supporting comprises a pin projecting from said support plate into the space between said side walls for supporting the lowermost article in a stack of articles, said pin being positioned to one side of a center line running up said support plate to hold the stack with the articles angularly positioned in the magazine with the lower end of each article engaging the side wall nearest the pin and the other upper ends engaging the other side wall.

6. A system as defined in claim 5 wherein said support plate is formed with an opening to receive a user's finger to facilitate gripping the lowermost article to withdraw the lowermost article in a direction away from said support plate.

7. A system as defined in claim 5 which includes:
a base having an acute angular face; and
means for attaching said support plate to said angular face.

8. A system as defined in claim 7 wherein said attaching means include a pair of slots formed in the lower edge of said plate, and a pair of bolts extending from said angular faced base to receive said plate slots.

* * * * *